United States Patent [19]

Collin

[11] 4,394,163

[45] Jul. 19, 1983

[54] PROCESS FOR THE MANUFACTURE OF CRUDE IRON AND SYNTHESIS GAS

[75] Inventor: Per H. Collin, Stocksund, Sweden

[73] Assignee: Asea AB, Västeras, Sweden

[21] Appl. No.: 275,325

[22] Filed: Jun. 19, 1981

[30] Foreign Application Priority Data

Jun. 23, 1980 [NO] Norway ............................... 801878

[51] Int. Cl.³ ............................................. C21C 5/52
[52] U.S. Cl. ............................................. 75/11; 75/12
[58] Field of Search ................... 75/11, 10 R, 12; 13/9 R

[56] References Cited

U.S. PATENT DOCUMENTS

| | | | |
|---|---|---|---|
| 1,427,436 | 8/1922 | Bradley | 13/10 |
| 2,139,853 | 12/1938 | Rohn | 75/11 |
| 3,940,551 | 2/1976 | Ling et al. | 13/9 R |
| 3,963,483 | 6/1976 | Mathesius et al. | 75/11 |
| 3,985,544 | 10/1976 | Collin et al. | 75/11 |
| 4,060,409 | 11/1977 | Ammann | 75/93 R |
| 4,076,954 | 2/1978 | Linder | 13/9 R |
| 4,080,195 | 3/1978 | Widell | 75/11 |
| 4,094,665 | 6/1978 | Collin et al. | 75/11 |
| 4,146,390 | 3/1979 | Widell | 75/11 |
| 4,177,061 | 12/1979 | Stonkuist et al. | 75/11 |
| 4,235,623 | 11/1980 | Rath | 75/11 |

OTHER PUBLICATIONS

Collin, P. H., Sticklor, H.; "ELRED-A New Process for the Less Expensive Production of Liquid Iron", Iron and Steel Engineer, pp. 43-45, Mar. 1980.

*Primary Examiner*—L. Dewayne Rutledge
*Assistant Examiner*—Christopher W. Brody
*Attorney, Agent, or Firm*—Curtis, Morris & Safford

[57] ABSTRACT

In a combined process crude iron and a synthesis gas particularly suitable for the preparation of methanol are prepared by supplying iron ore concentrate to the plasma zone between an electrode and a crude iron melt in an arc furnace, while injecting gaseous or volatile hydrocarbons, for example natural gas mainly consisting of methane, into the crude iron melt.

7 Claims, 1 Drawing Figure

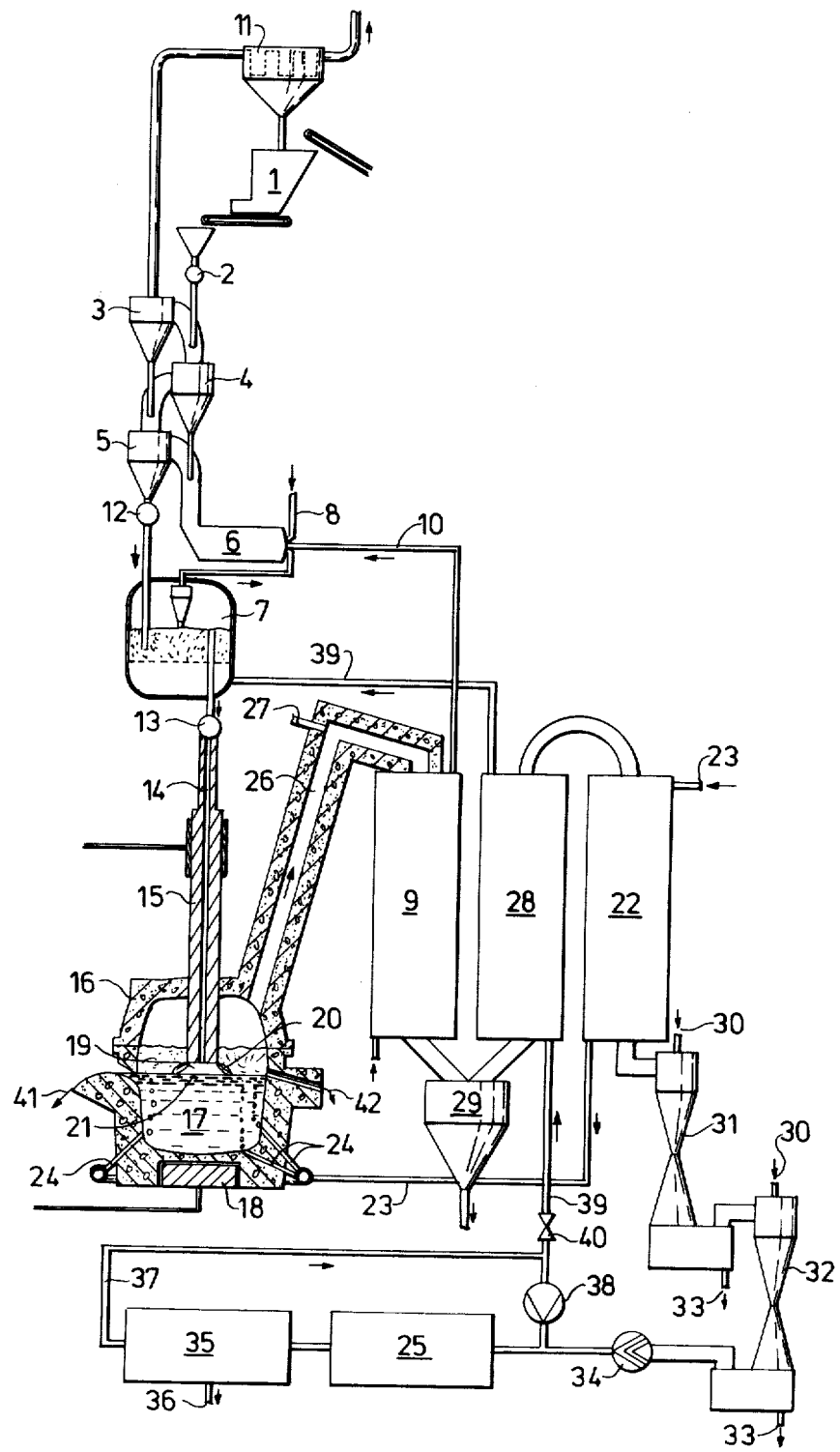

PROCESS FOR THE MANUFACTURE OF CRUDE IRON AND SYNTHESIS GAS

The present invention relates to a process of preparing crude iron and synthesis gas. The raw materials consist of fine-grained materials essentially consisting of iron oxide, for example iron ore concentrate, calcined iron pyrites or the like, gaseous or volatile hydrocarbons and electric energy. At sites with easily available natural gas or other gaseous or volatile hydrocarbons, for example ethane and propane, the process provides for great economic advantages by high product value, low production costs and low capital costs and it is particularly suited for manufacture of methanol.

According to the invention which is defined in the appended patent claims fine-grained material, essentially consisting of iron oxide, suitably more or less prereduced and in admixture with adjusted proportions of fine-grained slag formers (CaO, SiO$_2$ etc.) and after preheating, is introduced into the plasma zone between the electrode and a crude iron melt in an arc furnace, preferably supplied with direct current, the temperature of the crude iron melt being maintained, by means of adjusted supply of electric energy, above 1200° C. and preferably between 1300° C. and 1600° C., and gaseous hydrocarbons, suitably preheated, being injected into the crude iron at a depth of at least 30 cm below the crude iron surface.

The chemical reactions taking place in the arc furnace can be illustrated with the following equations, assuming for example that the hydrocarbon is methane and the iron oxide of the iron oxide-containing material has been prereduced to FeO$_{1.2}$:

$$1.4CH_4 = 1.4C + 2.8H_2 \tag{1}$$
$$FeO_{1.2} + 1.4C = (Fe + 0.2C) + 1.2CO \tag{2}$$
$$FeO_{1.2} + 1.4CH_4 = (Fe + 0.2C) + 2.8H_2 + 1.2CO \quad \Delta H = +72.2 \text{ kcal} \tag{3}$$

Equation (1) illustrates what happens when preheated methane is injected into the crude iron melt: the methane cracks and its carbon contents dissolve in the melt (C indicates dissolved carbon). In order that the cracking shall be complete and released carbon shall dissolve in the crude iron the injection of the natural gas must take place at a sufficient depth below the crude iron surface. In practice the required depth has been found to be at least 30 cm, preferably >50 cm. The period of contact between methane and crude iron can be further increased if the crude iron melt is agitated, for example by means of electromagnetic agitation.

Equation (2) illustrates what happens under the electrode on the surface of the crude iron melt when the somewhat prereduced iron oxide-containing material (FeO$_{1.2}$, cf. hematite FeO$_{1.5}$ and magnetite FeO$_{1.33}$) heated in the plasma zone impinges on the surface: The iron oxide contents of the concentrate will be reduced to Fe by carbon dissolved in the melt, said Fe melting under carburization to crude iron (Fe+0.2C), an equivalent quantity of carbon being oxidized to CO.

The gross reaction (3) is strongly endothermic (~72 kcal/mol Fe at 900° C. on the somewhat prereduced concentrate and 400° C. on the methane and requires a high temperature (>1200° C.). The energy required by the reaction is supplied by means of the arc and amounts to 2650 kWh/t Fe (at the above-defined conditions and 85% efficiency of the furnace). When using higher hydrocarbons the consumption of energy will be somewhat lower.

In the arc furnace crude iron and a gas mixture containing ~70% H$_2$ and ~30% CO are thus produced. When using higher hydrocarbons than methane the concentration of H$_2$ will be lower and the concentration of CO higher, but the ratio H$_2$:CO can be adjusted by conversion of part of CO with water vapour over a catalyst to H$_2$ and CO$_2$, the latter being then washed away. In this manner any desired ratio between H$_2$ and CO and particularly the above-indicated ratio which is particularly suited for the operation of methanol can be obtained. The main reaction in methanol manufacture can be illustrated by the following equation:

$$1.2CO + 2.8H_2 = 1.2CH_3OH + 0.4H_2 \tag{4}$$

As is clear from formula (4) the synthesis gas has a certain excess of H$_2$. This is advantageous since certain side reactions undesired in the methanol synthesis can be counteracted.

In order to obtain sufficient reaction rate reaction (4) will in practice be operated at an overpressure and by means of a catalyst, since the conversion in passing the catalyst is not complete the methanol is separated and unconverted gas recirculated. In order to maintain a suitable excess of H$_2$ part of the recirculation gas must, however, be discharged. The discharged was essentially consisting of H$_2$ is, in accordance with the invention, utilized for prereduction of the concentrate, which operation can be illustrated by the following equation:

$$0.5Fe_2O_3 + 0.4H_2 = FeO_{1.2} + 0.1H_2 + 0.3H_2O \tag{5}$$

In view of the conditions of equilibrium for reaction (5) only ¾ of the H$_2$-content of the discharge gas can be utilized for the prereduction. The energy contents of the gases discharged from the prereduction (physical+chemical) are according to the invention utilized through combustion with air, suitably preheated, for preheating the concentrate before the prereduction.

From equations 1-5 the gross reaction will be obtained.

$$0.5Fe_2O_3 + 1.4CH_4 = (Fe + 0.2C) + 1.2C-H_3OH + +0.3H_2/+0.1H_2 \tag{6}$$

At the conditions given above 560 Nm$^3$ methane and 2650 kWh are theoretically required per ton of Fe in crude iron obtained and 680 kgs of methanol are obtained as a byproduct.

The crude iron produced in the arc furnace has a very low sulphur content since the hydrocarbons, in a manner known per se, have been freed from sulphur before the injection. Moreover, the crude iron, in view of the prevailing conditions in the arc furnace, will obtain low contents (<0.1%) of Si as well as Mn. This fact makes crude iron prepared in accordance with the invention extremely suitable for "slagless refining", which makes the steel manufacture cheaper.

In order to further illustrate the process according to the invention it will be further described in connection with the drawing illustrating a specific example of the invention while using natural gas mainly consisting of methane.

Fine-grained iron ore concentrate admixed in adjusted proportions with suitable slag formers and having a grain size between 0–10 mm, suitably 0.5 mm and preferably 0.3 mm is transferred from silo 1 by means of feeder 2 in a constant adjusted flow to the preheating cyclones 3, 4 and 5. Said cyclones are designed in the same way as the preheating cyclones of a modern cement furnace (see for example Ullman: Encyklopädie der Technischen Chemie 3. Aufl. 19 Bd s 17 Bild 8). In the cyclones the mixture is counter-currently contacted with hot gases obtained by combustion in combustion chamber 6 of the gases from the fluidized prereduction bed 7 and optionally other fuels 8, for example natural gas, with air 10 preheated in gas cooler 9. The exhaust gases from cyclones 3, 4, 5 are purified in a dust filter 11 and are then released whereas the dust is returned to the concentrate. The preheated material is locked 12 into the prereduction bed 7 wherein it is prereduced to about $FeO_{1.2}$.

From prereduction bed 7 which is under a moderate overpressure the prereduced material is locked 13 and introduced into the passage 14 centrally positioned in electrode 15 to arc furnace 16 supplied with direct current. The said electrode 15 is suitably coupled as a cathode, whereas the crude iron melt 17 is coupled as an anode through one or several bottom electrodes 18. The material sinks through passage 14 and plasma zone 19 under the electrode down onto the surface of the crude iron melt 17 in the focal spot 21 formed by the arc 20. Here the contents of iron oxides of the material are reduced to Fe by carbon dissolved in the melt, an equivalent quantity of CO being released. The iron melts under carburization to crude iron and the carbon content of the melt is maintained at above 2%, suitably 2.5–4%, by injection of natural gas 23 preheated in cooler 22. The injection takes suitably place in several part flows 24 at a depth of at least 30 cm, preferably >50 cm below crude iron surface.

In the injection the natural gas cracks, the reaction being strongly endothermic. At large injected flows the heat absorption may be so extensive that there is risk for freezing of the opening of the injection nozzle with solid crude iron. Such freezing may, however, be counteracted by injecting an inert gas, for example discharged gas from the synthesis plant 25, in a thin annular about and concentric with the injection opening for natural gas.

It is previously known, for example from Swedish Pat. No. 326,243, that agitation can be provided quite easily in the melt of arc furnaces supplied with direct current by applying a constant magnet field to the melt. In view of the agitation the melt will move past the injection nozzles, the gas bubbles formed being smaller and distributed in a larger quantity of melt. This will increase contact surface as well as contact time.

$H_2$ released in cracking the natural gas in the crude iron melt will admix with CO released in the reduction and discharged through line 26, optionally after moderate cooling by introducing direct into the gas stream a suitable coolant 27, preferably an equimolecular mixture of natural gas and water vapour. Cooling then takes place in view of the reaction

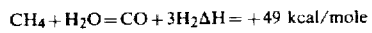
$CH_4 + H_2O = CO + 3H_2 \Delta H = +49$ kcal/mole which is strongly endothermic. The $CH_4/H_2O$-flow is suitably adjusted so that the gas temperature on entering cooler 9 is 800°–1000° C., 90% of supplied $CH_4$ and $H_2O$ being converted.

By heat exchange against air, discharged gases and recirculated gases in cooler 9, 28, 22 the gases are cooled, precipitated dust being separated at 29 returned to the concentrate. The gases are further purified by scrubbing with water 30 in Venturi scrubbers 31 and 32. The discharged washwater 33 contains soot that can be transferred to a hydrocarbon phase, for example by treatment with naphtha. From the naphtha the soot can be easily separated and blown with the natural gas into the crude iron melt 17. The gases are then compressed at 34 and supplied to the synthesis plant 25. Therein parts of the gases are converted to liquid products, preferably methanol. After condensation in condenser 35 and recovery of the liquid products 36 the remaining gases 37 are recirculated through a booster compressor 38 to the synthesis plant. A minor part 39 of the gases is discharged through a pressure reducing valve 40 to maintain the $H_2$-excess in the synthesis plant at a suitable level. The discharged gases are suitably used after preheating in one of coolers 28 for the prereduction in fluid bed 7 in the manner described above. Crude iron 41 and sludge 42 are discharged from the arc furnace.

I claim:

1. A process for converting an iron oxide into crude iron which comprises: I. introducing in an arc furnace, a fine-grained material essentially containing iron oxide into a plasma zone between an electrode and a melt surface of a crude iron melt, and II. injecting a gaseous or volatile hydrocarbon into said crude iron melt at a depth of at least 30 cm below the surface thereof, comprising:

a.1 preheating the iron oxide-containing material, or said iron oxide-containing material in admixture with adjusted quantities of slag formers, by means of combustion gases from burning the gases from the prereduction according to a.2 or supplementally with other fuels;

a.2 prereducing the preheated concentrate according to a.1;

a.3 introducing the concentrate prereduced according to a.2 in the plasma zone below the electrode in an arc furnace of a direct current type, said furnace containing a crude iron melt, the temperature of said melt, by means of adjusted supply of electrical energy to the arc, is maintained over 1200° C., and the content of dissolved carbon in said melt is maintained above 2% by injecting suitably preheated hydrocarbons into the crude iron melt at a depth exceeding 30 cm below the surface of the melt;

a.4 precooling the gases leaving the arc furnace by introducing directly into the leaving gases an adjusted flow of coolant, or a mixture of natural gas and water vapor, and a.5 recovering a substantial part of the physical heat content of the precooled gases, and purifying from dust said precooled gases by scrubbing.

2. A process as defined in claim 1 and wherein hydrocarbons are injected at a depth exceeding 50 cm below the surface of the melt.

3. A process according to claim 1 and wherein the crude iron melt is agitated.

4. A process as defined in claim 1 characterized in that the gases discharged from the arc furnace, or after adjustment of the ratio $H_2:CO$, cooling, and dust precipitation, are used as synthesis gases, such as for preparation of methanol.

5. A process as defined in claim 1 wherein hydrocarbon natural gas mainly consisting of methane is employed.

6. A process according to claim 1, and wherein the concentrate is prereduced with gases discharged from a synthesis plant.

7. A process as defined in claim 1, wherein the recovery of a substantial part of the physical heat content of the precooled gases takes place by heat exchange with air, discharged gases and hydrocarbons.

* * * * *